Patented May 19, 1942

2,283,740

UNITED STATES PATENT OFFICE 2,283,740

ADHESIVE COMPOSITION

Hanns Klemm, Boblingen, Wurttemberg, Germany, assignor, by mesne assignments, to Davis & Company, Incorporated, Houston, Tex., a corporation of Nevada No Drawing. Application December 13, 1937, Serial No. 179,544

5 Claims. (Cl. 260—45)

This invention relates to masses adapted for gluing and molding and to a process for making and using same.

The object of the invention is to provide an artificial resinous mass which is capable of conveniently gluing together wood and other materials in a substantially waterproof and extremely resistant manner, which can further be molded into relatively strong insulating articles that are highly resistant to the action of water and acids and unaffected by higher temperatures.

According to the invention, the new mass which is provided consists of a binding agent of water soluble partially reacted synthetic resin hardenable by the addition of a hardening agent and to which is added an already hardened synthetic resin in comminuted condition, for example, a powdered, fully cured phenol-formaldehyde condensation product, such as is sold under the trade name Bakelite. The amount and degree of comminution of the added hardened synthetic resin is dependent upon whether the mass is to be used for gluing or for the manufacture of molded articles. If the mass is to be used for gluing, the added hardened artificial resin must be relatively finely ground whilst for the production of a moldable mass coarsely ground powder suffices, though a finer powder may also be employed.

As a binding agent, I use a water soluble condensation product of urea formaldehyde as, for example, the material sold under the trade-name Kaurit and which is in the form of an aqueous glue. This glue contains about 67% of a cold setting urea-formaldehyde resin and about 33% water. To the glue there may be added 10% more or less of finely ground hardened synthetic resin, as, for example, the waste left over from pressing the material sold under the trade name Bakelite.

To the plastic mixture produced there is added a suitable hardening agent which may be chosen from those known to the art as adapted for this purpose and is taken in the usual amount.

Glue

When an aqueous solution of a water soluble condensation product of urea and formaldehyde is to be used according to the invention, it is mixed with approximately 10% of finely ground hardened synthetic resin. Finely ground Bakelite waste left over in pressing may be economically used. The plastic mixture produced, after a suitable hardening agent has been added thereto, is applied to the surfaces to be glued together. The surfaces are held together until the layer of glue has perfectly hardened. The gluing may also be attained by applying the mixture of the urea-formaldehyde condensation product and the hardened synthetic resin powder to one of the surfaces to be joined and the hardening agent to the other and pressing the contacting surfaces together until curing is effected. The result is a perfectly waterproof joint.

The mixture of 10 parts of Kaurit, or like water solutions of water soluble urea-formaldehyde condensation products with 1 part of a powdered and hardened synthetic resin, such as Bakelite press waste, produces highly satisfactory results, though the quantity of the powdered hardened synthetic resin may be approximately doubled to obtain still better effects, provided, of course, the spreadability of the glue is maintained.

The advantages afforded by this addition of a hardened and powdered artificial resin consist not only in reducing costs by substituting cheap powders of hardened artificial resin waste for a portion of the relatively expensive liquid artificial resin but also in insuring good filling of the joint between two members to be glued together, without necessarily accurate fitting. Furthermore, owing to this addition of powdered synthetic resin to synthetic resin glue, the hardening agent can enter the layer of glue more easily and to a greater depth so as to shorten the time required for thorough hardening. As in case of casein glue, the binding power is greater than the strength of the wood itself, so that for instance in case of longitudinal hardwood fibers gluing strengths up to approximately 1280 lbs./square inch, and for wood cut across the grain even almost up to 2500 lbs./square inch can be attained. Heretofore, such strengths could not consistently be obtained with known agents. They yielded highly uncertain resistance values.

Molded articles

In producing molded articles, the same artificial resins are used as for gluing, but the amount of filling material is increased. As a rule, enough powdered and hardened synthetic resin is added to produce a viscous mass which is unsuited for gluing and must be poured, pressed or stamped into a mold. It is mixed with a suitable hardening agent to insure quicker hardening.

In this way, articles of hardenable artificial resin can be produced without the use of presses; by pouring, pressing or stamping the mass into molds. To exert a certain pressure upon the plastic mass in the mold without resorting to presses a porosity-producing substance, such as ammonium carbonate, may be added which evaporates prior to the hardening of the mass and thus forms bubbles therein with the result that owing to the pressure of the gases developed the mass is forced into all parts of the mold and then hardens. The formation of bubbles renders the mass also porous, and the formation of gas and vapor by the porosity-producing agent as well as the hardening of the molded mass can be accelerated by heating both the mold and the still plastic mass contained therein.

In the modification last above described, hardening of the molded mass is accelerated by an increase in temperature. The use of pressure may be dispensed with or only slightly resorted to in so far as the hardening process is effected by heating in closed molds to vaporize volatile constituents (porosity-producing substances) of the molded mass, whereby the mass to be hardened is subjected to a certain pressure and, as before stated, is forced into all parts of the mold. Owing to the relatively low temperature of 75° to 120° C. used even when a porosity-producing substance is to be volatilized and the application of low pressure or of no pressure at all, the hardening will require a relatively long time.

In order to shorten the hardening period one may place thoroughly mixed powdered hardened synthetic resin and aqueous solution of urea-formaldehyde resin in a mold, and simultaneously applying heat and pressure thereto.

Since the water soluble urea-formaldehyde condensation products are relatively expensive, in making molded articles, it is desirable instead of pulverizing the hardened synthetic resin, to granulate it so as to impart a smaller surface thereto. This means that a smaller amount of the relatively expensive binding agent is required for enveloping and connecting the grains. By hardening the binding agent surrounding the grains, all grains are firmly united to form a compact body containing numerous air cavities between grains.

In the production of articles from the mass described difficulties may arise due to the tendency of the mass to stick to the mold. This may be remedied in various ways, for instance by using a mold made of aluminum or an aluminum alloy like duraluminum.

Having described my invention, what I claim as new and desire to secure by Letters Patent is:

1. A spreadable cold setting adhesive composition comprising particles of a comminuted C-stage synthetic resin, a water soluble partially reacted cold setting urea-formaldehyde condensation product in the form of an aqueous glue, and a hardening catalyst, said urea-formaldehyde condensation product glue being present in an amount up to about 10 parts to about 1 part of said synthetic resin.

2. A spreadable cold setting adhesive composition comprising particles of a comminuted C-stage synthetic resin, a water soluble partially reacted cold setting urea-formaldehyde condensation product in the form of an aqueous glue, and a hardening catalyst, said urea-formaldehyde condensation product glue being present in about 5 to 10 parts to about 1 part of said synthetic resin.

3. A spreadable cold setting adhesive composition comprising particles of a comminuted C-stage phenol-formaldehyde resin, a water soluble partially reacted cold setting urea-formaldehyde condensation product in the form of an aqueous glue, and a hardening catalyst, said urea-formaldehyde condensation product glue being present in an amount up to about 10 parts to about 1 part of said phenol-formaldehyde resin.

4. A spreadable cold setting adhesive composition comprising a water soluble partially reacted cold setting urea-formaldehyde condensation product in the form of an aqueous glue, a C-stage phenol-formaldehyde resin in the form of finely divided particles, and a suitable hardening catalyst, said phenol-formaldehyde condensation product glue being present in from about 5 to 10 parts to about 1 part of the phenol-formaldehyde resin.

5. A spreadable cold setting adhesive composition comprising a water soluble partially reacted cold setting urea-formaldehyde condensation product in the form of an aqueous glue, a hardening catalyst, and finely divided particles of a C-stage phenol-formaldehyde resin, said urea-formaldehyde condensation product glue being present in about 10 parts to about 1 part of the phenol-formaldehyde resin.

HANNS KLEMM.